(12) United States Patent
Stumpf

(10) Patent No.: US 6,687,087 B2
(45) Date of Patent: Feb. 3, 2004

(54) SYSTEM AND METHOD FOR VISUALLY INDICATING USAGE OF MAGNETIC TAPE CARTRIDGES

(75) Inventor: Michael Joseph Stumpf, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 202 days.

(21) Appl. No.: 09/975,201

(22) Filed: Oct. 11, 2001

(65) Prior Publication Data

US 2003/0072107 A1 Apr. 17, 2003

(51) Int. Cl.[7] .............................. G11B 23/02; G11B 5/78
(52) U.S. Cl. ........................................ 360/137; 360/132
(58) Field of Search ................................. 360/131, 132, 360/134, 137; 242/344

(56) References Cited

U.S. PATENT DOCUMENTS

| 4,092,680 A | * | 5/1978 | Sander ...................... 360/72.3 |
| 4,554,443 A | * | 11/1985 | Lambert et al. ............. 235/103 |
| 4,575,778 A | | 3/1986 | Vogelgesang ................ 360/132 |
| 4,586,101 A | * | 4/1986 | Vogelgesang ................ 242/344 |
| 4,797,753 A | | 1/1989 | Montgomery .................. 360/27 |
| 4,802,048 A | | 1/1989 | Perkins et al. .............. 360/132 |
| 5,130,879 A | * | 7/1992 | Weiley ........................ 360/132 |
| 5,992,782 A | * | 11/1999 | Goodknight ................. 242/340 |
| 6,155,510 A | | 12/2000 | Solomon et al. ............. 242/343 |
| 6,285,518 B1 | | 9/2001 | Zweighaft ..................... 360/25 |
| 6,433,962 B2 | * | 8/2002 | Solomon et al. ............. 360/132 |

* cited by examiner

Primary Examiner—Hoa T. Nguyen
Assistant Examiner—Julie Anne Watko
(74) Attorney, Agent, or Firm—Duke W. Yee; Mark E. McBurney; Lisa L. B. Yociss

(57) ABSTRACT

A system and method are disclosed for visually indicating a usage of a magnetic tape that is included in a magnetic tape cartridge. The apparatus includes a take-up spindle for receiving magnetic tape when the magnetic tape is moving in a forward motion. The apparatus also includes a meter assembly having a meter coupled to the take-up spindle. In a first embodiment, the meter is incremented only in response to each full rewind of the magnetic tape. In a second embodiment, the meter is incremented in an amount that is directly proportional to the amount of each rewind of the tape.

12 Claims, 2 Drawing Sheets

SYSTEM AND METHOD FOR VISUALLY INDICATING USAGE OF MAGNETIC TAPE CARTRIDGES

BACKGROUND OF THE INVENTION

1. Technical Field

The present invention relates generally to the field of storage devices for data processing systems, and more specifically to a system and method for visually indicating the usage of a magnetic tape cartridge.

2. Description of Related Art

Magnetic tape cartridges that include magnetic tapes have been frequently used as storage devices for data processing systems. The reliability of magnetic tapes typically decreases as the tapes are used. Simply winding and rewinding a tape causes wear on the tape and reduces its reliability, as does repeated reading from and writing to the tape. At some point, data written to an old tape will no longer be able to be retrieved.

Currently, system administrators attempt to manually track the usage, and thus age of a tape, or must implement a fairly complex system of tracking the usage. Very large arrays of tape drives are often implemented in today's data processing systems. It becomes very difficult to track the usage of these large numbers of tape cartridges.

One known complex system for tracking the wear of a tape is described in U.S. Pat. No. 6,285,518 B1, issued to Zweighaft. This system is a media wear monitoring system that uses predefined locations inserted onto the tape media itself. In this system, the tape itself has been altered. The system logs information about the number of times these locations are passed.

Another known system. U.S. Pat. No. 4,575,778, issued to Vogelgesang, describes a tape cassette that includes a run counter disc. A tape reel includes spaced protrusions that extend outward from the outer flange of the reel. These protrusions are used to track the winding of the tape.

U.S. Pat. No. 4,797,753 describes a monitor for visually indicating wear. Wear is determined by analyzing a special signal that has been recorded on the tape.

Therefore, a need exists for a system and method for visually indicating the usage of a magnetic tape cartridge.

SUMMARY OF THE INVENTION

A system and method are disclosed for visually indicating a usage of a magnetic tape that is included in a magnetic tape cartridge. The apparatus includes a take-up spindle for receiving magnetic tape when the magnetic tape is moving in a forward motion. The apparatus also includes a meter assembly having a meter coupled to the take-up spindle. In a first embodiment, the meter is incremented only in response to each full rewind of the magnetic tape. In a second embodiment, the meter is incremented in an amount that is directly proportional to the amount of each rewind of the tape.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a system and method for visually indicating the usage of a magnetic tape that is included within a magnetic tape cartridge. In a first embodiment, a usage meter is incremented in response to a complete rewind of the magnetic tape. A rewind of the tape that is not a full rewind will not cause any incrementing of the usage meter. In a second embodiment, the usage meter is incremented in response to any rewind of the tape in proportion to the amount of each rewind.

Figure 1:
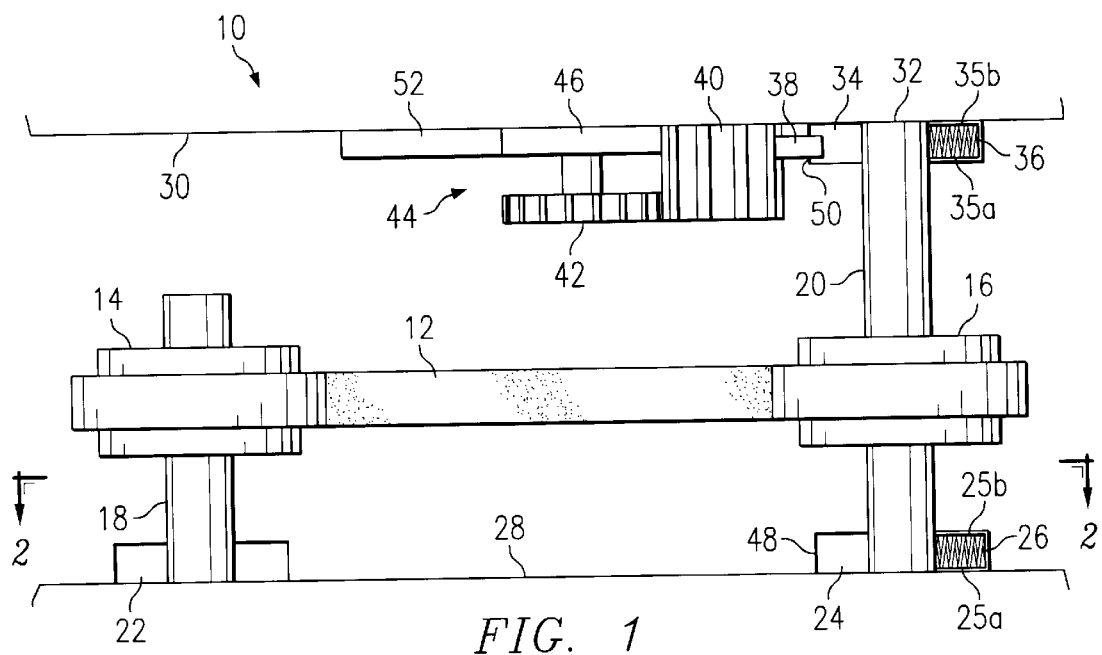
FIG. 1 is a side view of a portion of a tape cartridge including a usage mechanism in accordance with a first embodiment of the present invention.
Figure 2:
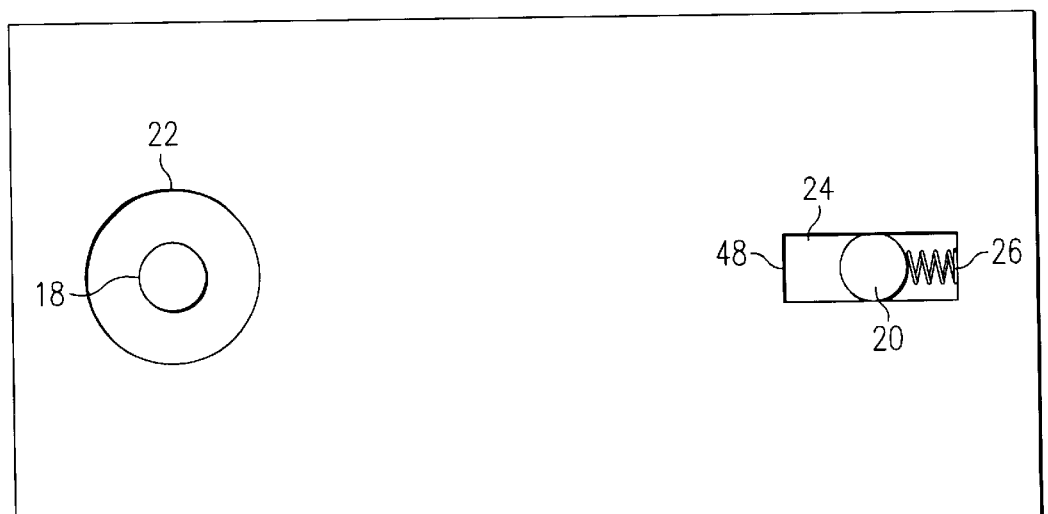
FIG. 2 is a partial view of the tape cartridge of FIG. 1 taken along a line 2—2 in accordance with the present invention.

FIG. 1 is a side view of a portion of a tape cartridge that includes a usage mechanism in accordance with a first embodiment of the present invention. FIG. 2 is a partial view of the tape cartridge of FIG. 1 taken along a line 2—2 in accordance with the present invention.

A tape cartridge 10 includes a magnetic tape 12 that is supplied from a supply reel 14 to a take-up reel 16. Supply reel 14 extends around fixed supply spindle 18, and take-up reel 16 extends around a moveable take-up spindle 20. Supply spindle 18 is fixed in place utilizing fixed spindle mount 22.

Moveable take-up spindle 20 is capable of lateral movement within a casing 24. A spring 26 is coupled to spindle 20 and to a side wall of casing 24. Spring 26 restricts lateral movement of spindle 20 as described below and generally holds spindle 20 in a first position. Movement blockers 25a and 25b are included in casing 24 to prevent lateral movement of spindle 20 away from spindle 18.

Spindle 20 extends from a bottom 28 of cartridge 10 to a top 30 of cartridge 10. A top 32 of spindle 20 is received within a casing 34. Casing 34 permits lateral movement of top 30. A spring 36 is coupled to spindle 20 and to a side wall of casing 34. Spring 36 restricts lateral movement of spindle 20 as described below and generally holds spindle 20 in a first position. Movement blockers 35a and 35b are included in casing 34 to prevent lateral movement of spindle 20 away from spindle 18.

A push button 38 is coupled to casing 34 and to a gear assembly 40. Gear assembly 40 is coupled to a meter gear 42 included within meter assembly 44. Meter assembly 44 also includes a meter 46.

In operation, when the tape is moving in a forward direction, tape is gradually transferred from supply reel 14 to take-up reel 16. During this movement of the tape in a forward direction, springs 26 and 36 hold spindle 20 in a first position. First position is the position depicted in FIGS. 1 and 2.

Once the tape has been completely transferred to take-up reel 16, a rewind motion will begin causing the tape to be transferred from take-up reel 16 back to supply reel 14. Again, springs 26 and 36 hold spindle 20 in a first position. When all of the tape has been transferred back to supply reel 14, a motor (not shown) will continue to exert a force on spindle 20 until sufficient force is detected to indicate that the beginning of the tape has been reached. This force exerted on spindle 20 when the beginning of the tape has been reached will be greater than the force exerted on spindle 20 by springs 26 and 36 thus causing spindle 20 to move in a lateral direction into a second position within casings 24 and 34 toward side wall 48 of casing 24 and side wall 50 of casing 34.

When spindle 20 has moved to side walls 48 and 50, and thus is in its second position, top 32 of spindle 20 will push the push button 38. Push button 38 will then engage gear assembly 40 causing a movement of gears resulting in a single ratchet of gear assembly 40 and thus a single ratchet of gear 42. The single ratchet of gear 42 will cause meter assembly 44 to advance resulting in a single increment of meter 46.

Thus, the first embodiment describes a usage meter whereby a full rewind of the tape will result in a single ratchet of the meter assembly, and a single increment of the meter.

Once the rewind force exerted on spindle 20 stops, springs 26 and 36 will cause spindle 20 to move back to the first position causing spindle 20 to release push button 38. Blockers 25a, 25b, 35a, and 35b will stop any lateral movement of spindle 20 past its first position.

Gear assembly 40 is selected in order to transfer enough force to result in a single ratchet of gear 42. Such gear assemblies are known in the art and not described herein.

A reset button 52, accessible from the outside of tape cartridge 10, is coupled to meter 46 to reset meter 46. Any one of many different types of available reset buttons may be implemented reset button 52.

Figure 3:
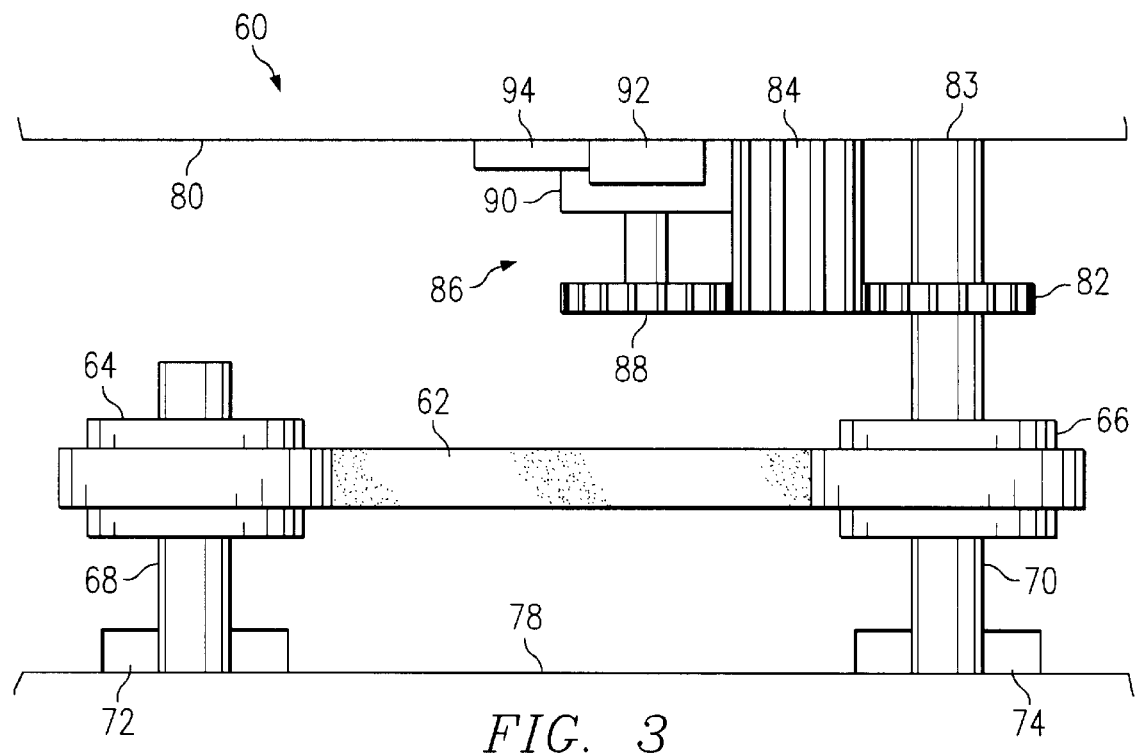
FIG. 3 is a side view of a portion of a tape cartridge including a usage mechanism in accordance with a second embodiment of the present invention.

FIG. 3 is a side view of a portion of a tape cartridge that includes a usage mechanism in accordance with a second embodiment of the present invention.

A tape cartridge 60 includes a magnetic tape 62 that is supplied from a supply reel 64 to a take-up reel 66. Supply reel 64 extends around a fixed supply spindle 68, and take-up reel 66 extends around a fixed take-up spindle 70. Supply spindle 68 is fixed in place utilizing fixed spindle mount 72. Take-up spindle 70 is fixed in place utilizing fixed spindle mount 74.

Spindle 70 extends from a bottom 78 of cartridge 60 to a top 80 of cartridge 60. A gear 82 extends around a top 83 of spindle 70. Gear 82 is coupled to gear assembly 84. Gear assembly 84 is also coupled to a meter assembly 86 that includes a gear 88. Gear 88 is coupled to a single-direction ratchet 90. Ratchet 90 is then coupled to a meter 92.

In operation, when the tape is moving in a forward direction, tape is gradually transferred from supply reel 64 to take-up reel 66. Ratchet 90 will not move when tape 62 is moving in a forward direction. Thus, meter 92 will not be incremented when tape 62 is moving in a forward direction.

When tape 62 is being rewound in a reverse direction, gear 82 will engage and move gear assembly 84, which in turn will engage and move gear 88. When tape 62 is being rewound, ratchet 90 will move and thus will increment meter 92. Therefore, when the tape is moving in a reverse direction, meter 92 will be incremented in direct proportion to the amount of the rewind.

Gear assembly 84 is selected in order to sufficiently reduce the angular velocity of gear 82 to an appropriate amount to move gear 88. Such gear assemblies are known in the art and not described herein.

A reset button 94, accessible from the outside of tape cartridge 60, is coupled to meter 92 to reset meter 92. Any one of many different types of available reset buttons may be implemented reset button 94.

Figure 4:
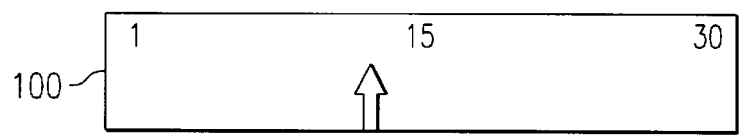
FIG. 4 is a top view of a usage meter in accordance with the present invention.

FIG. 4 is a top view of a usage meter 100 in accordance with the present invention. Usage meter 100 is one example of a meter that may be implemented as either meter 46 or meter 92.

The meter is secured within the tape cartridge itself and is clearly visible to a user. The meter has a needle that is capable of moving from an initial setting along a calibrated scale to an ending setting. The meter is calibrated in an arbitrary, but specific manner.

While a preferred embodiment has been particularly shown and described, it will be understood by those skilled in the art that various changes in form and detail may be make therein without departing from the spirit and scope of the present invention.

What is claimed is:

1. An apparatus for tracking usage of a magnetic tape stored within a magnetic tape cartridge, said apparatus comprising:

a take-up spindle for receiving said magnetic tape when said magnetic tape is moving in a forward motion; and a meter assembly including a meter coupled to said take-up spindle, said meter being incremented only in response to each full rewind of said magnetic tape; and a gear assembly disposed between said take-up spindle and said meter assembly for reducing an angular velocity of said take-up spindle.

2. The apparatus according to claim 1, further comprising:

a bottom casing attached to a bottom of said magnetic tape cartridge, a bottom of said take-up spindle being received within said bottom casing;

a top casing attached to a top of said magnetic tape cartridge, a top of said take-up spindle being received within said top casing; and said bottom and said top casings permitting lateral movement of said take-up spindle.

3. The apparatus according to claim 2, further comprising:

a bottom spring secured to said bottom of said take-up spindle and a side wall of said bottom casing;

a top spring secured to said top of said take-up spindle and a side wall of said top casing; and said bottom spring and said top spring for holding said take-up spindle in a first position.

4. The apparatus according to claim 2, further comprising a push button extending into said top casing, said take-up spindle engaging and pushing said push button in response to each full rewind of said magnetic tape.

5. The apparatus according to claim 4, further comprising a gear assembly disposed between said push button and said meter assembly, said push button causing said gear assembly to advance in response to said push button being pushed.

6. The apparatus according to claim 5, wherein said meter assembly further comprises:

a meter gear, said meter gear being coupled to said gear assembly, said gear assembly causing said meter gear to advance when said gear assembly advances; and said meter being advanced in response to said meter gear being advanced.

7. The apparatus according to claim 6, further comprising a fixed supply spindle.

8. An apparatus for tracking usage of a magnetic tape stored within a magnetic tape cartridge, said apparatus comprising:

a take-up spindle for receiving said magnetic tape when said magnetic tape is moving in a forward motion; and a meter assembly including a meter coupled to said take-up spindle, said meter being incremented in response to each rewind of said magnetic tape;

a gear secured around a top of said take-up spindle; and a gear assembly disposed between said gear and said meter assembly, wherein said gear engages said gear assembly and said gear assembly engages a single-direction ratchet included within said meter assembly, further wherein said gear assembly reduces an angular velocity of said gear.

9. The apparatus according to claim 8, further comprising said meter assembly including a meter, said meter being incremented in response to each movement of said ratchet, wherein said meter is incremented in an amount that is in direct proportion to an amount of each rewind.

10. A method in a magnetic tape cartridge that includes a magnetic tape for tracking a usage of said magnetic tape, said method comprising the steps of:

providing a take-up spindle in a first position for receiving said magnetic tape when said magnetic tape is moving in a forward motion, said take-up spindle capable of lateral movement toward a fixed, supply spindle;

rewinding said magnetic tape causing said magnetic tape to move in a reverse direction;

exerting a force on said take-up spindle by said tape in response to reaching a beginning of said tape at an end of said rewind;

pulling, by said tape, said take-up spindle toward said supply spindle into a second position;

pushing a push button utilizing said take-up spindle when said tape pulls said take-up spindle into said second position;

engaging and moving a gear assembly utilizing said push button in response to said push button being pushed;

engaging and moving a meter gear in response to said gear assembly being moved, said meter gear being coupled to said gear assembly; and incrementing a meter that is coupled to said meter gear in response to said meter gear being moved, wherein said meter is incremented only in response to a full rewind of said tape.

11. The method according to claim 10, further comprising the step of moving said take-up spindle back into said first position utilizing a spring, said take-up spindle releasing said push button when said take-up spindle is moved back to said first position.

12. A method in a magnetic tape cartridge that includes a magnetic tape for tracking a usage of said magnetic tape, said method comprising the steps of:

moving said tape in a reverse direction;

moving a gear secured around a top of a take-up spindle in response to a movement of said tape, wherein said gear moves in conjunction with and a direction of said take-up spindle;

moving a gear assembly coupled to said gear in response to a movement of said gear, wherein said gear engages said gear assembly and said gear assembly reduces an angular velocity of said gear;

moving a meter gear coupled to said gear assembly in response to a movement of said gear assembly;

moving a one-direction ratchet coupled to said meter gear in response to a reverse movement of said tape, said ratchet capable of movement only in response to said tape being moved in said reverse direction, said ratchet being incapable of movement when said tape is being moved in a forward direction, said ratchet being moved in an amount in direct proportion to an amount of movement of said tape; and incrementing a meter coupled to said ratchet in response to a movement of said ratchet, wherein said meter is incremented in an amount in direct proportion to an amount of movement of said tape.

* * * * *